(12) United States Patent
Makino et al.

(10) Patent No.: US 7,187,306 B2
(45) Date of Patent: Mar. 6, 2007

(54) KEY INPUT DEVICE AND PORTABLE TELEPHONE COMPRISING SAME

(75) Inventors: Masami Makino, Mizuho (JP); Kazuhito Fukumasu, Settsu (JP)

(73) Assignees: Sanyo Electric Co. Ltd., Moriguchi (JP); Sanyo Telecommunications Co. Ltd., Daito (JP)

( * ) Notice: Subject to any disclaimer, the term of this patent is extended or adjusted under 35 U.S.C. 154(b) by 501 days.

(21) Appl. No.: 10/646,921

(22) Filed: Aug. 25, 2003

(65) Prior Publication Data

US 2004/0077384 A1   Apr. 22, 2004

(30) Foreign Application Priority Data

Aug. 23, 2002   (JP) ............................. 2002-244228

(51) Int. Cl.
| | |
|---|---|
| H01H 9/00 | (2006.01) |
| H01H 3/12 | (2006.01) |
| G09G 5/00 | (2006.01) |
| H04M 1/22 | (2006.01) |
| F21V 33/00 | (2006.01) |

(52) U.S. Cl. ..................... 341/21; 200/314; 200/341; 345/170; 362/24; 362/85

(58) Field of Classification Search .................. 341/21; 345/102, 170, 173, 167; 340/815.4, 815.48, 340/815.49, 815.53; 313/506, 509.5; 40/542, 40/544; 455/566; 200/314

See application file for complete search history.

(56) References Cited

U.S. PATENT DOCUMENTS

| | | | | |
|---|---|---|---|---|
| 5,971,557 A | * | 10/1999 | Kubes et al. .................. 362/24 |
| 6,084,190 A | * | 7/2000 | Kenmochi ................... 200/341 |
| 6,100,478 A | * | 8/2000 | LaPointe et al. ............. 200/314 |
| 6,148,075 A | * | 11/2000 | Inubushi et al. ............. 379/368 |
| 6,670,565 B2 | * | 12/2003 | Hanahara et al. ............ 200/314 |
| 6,704,004 B1 | * | 3/2004 | Ostergård et al. .......... 345/170 |
| 6,765,503 B1 | * | 7/2004 | Chan et al. ................... 341/22 |
| 6,871,978 B2 | * | 3/2005 | Chan et al. ................... 362/85 |

FOREIGN PATENT DOCUMENTS

| | | |
|---|---|---|
| JP | 11-066997 | 3/1999 |
| KR | 2002-0038200 | 5/2002 |
| KR | 9-5-2005-035227189 | 7/2005 |

\* cited by examiner

*Primary Examiner*—Jeffery Hofsass
*Assistant Examiner*—Kimberly Jenkins
(74) *Attorney, Agent, or Firm*—Armstrong, Kratz, Quintos, Hanson & Brooks, LLP.

(57) ABSTRACT

The invention provides a key input device comprising a plurality of key tops 7 arranged on a surface of a main body case, each of the key tops 7 having a body 73 of transparent resin, the key body 73 being provided with a light blocking film 71 formed over a front surface thereof, the light blocking film 71 being partly cut out to form a light transmitting pattern 72 representing a character. LEDs 8 are arranged below the key tops 7. Each of the key tops 7 has a semitransparent screen 9 formed on a rear surface thereof in an area to be illuminated with LEDs 8 and extending only over a region opposed to the light transmitting pattern 72.

6 Claims, 5 Drawing Sheets

PORTION A AS ENLARGED

KEY INPUT DEVICE AND PORTABLE TELEPHONE COMPRISING SAME

FIELD OF THE INVENTION

The present invention relates to key input devices for entering numerals and characters and to portable telephones comprising the key input device.

BACKGROUND OF THE INVENTION

Portable telephones have a plurality of input keys arranged on the surface of a main body case, and the surface of each of the input keys has printed thereon a key identification symbol, such as a numeral, character, and the like (hereafter referred to merely as a "character"). When such input keys are depressed, characters can be input. Portable telephones are also known wherein in view of the manipulability of input keys in the nighttime, the bodies of the input keys of light transmitting resin are each provided with a light blocking film formed by coating and partly cut out to provide a light transmitting pattern in the form of a character, and the input keys are illuminated from below with LEDs in the nighttime.

However, portable telephones wherein the input keys are illuminated from below have the problem of being undesirable in design because when the LEDs are off, the structure in the rear of the key body can be seen through the body which is transparent. To overcome this problem, it appears useful to make the key bodies from a semitransparent resin, but light is then transmitted through the key bodies in a reduced amount, giving rise to the problem that the characters are not readily visible in the nighttime.

SUMMARY OF THE INVENTION

An object of the present invention is to provide a key input device and a portable telephone which comprise input keys each adapted to show a character or characters thereon as illuminated with a sufficient amount of light when illuminated with a light source and nevertheless not permitting the interior structure to be seen through the body of the key when the light source is off.

The present invention provides a key input device which comprises a plurality of input keys arranged on a surface of a main body case, each of the input keys having a body of transparent resin, the key body being provided with a light blocking film 71 formed over a front surface thereof, the light blocking film 71 being partly cut out to form a light transmitting pattern 72 representing a character, the input keys being provided with a light source positioned therebelow for illuminating the input keys. The present invention also provides a portable telephone which comprises the key input device of the invention.

Each of the input keys has a semitransparent screen 9 formed on a rear surface thereof in an area to be illuminated with the light source, the screen 9 extending over a portion of the area to be illuminated which portion includes a region opposed to the light transmitting pattern 72. The screen 9 can be colorless, or can alternatively be colored.

With the key input device and portable telephone of the present invention, the screen 9 in the rear can be seen through the light transmitting pattern 72 because the key body is transparent, when the front surface of the input key is observed with the light source off, whereas since the screen 9 is semitransparent, the character appears black in its entirety and is satisfactorily visible.

On the other hand, when the light source is on as in the nighttime, the light from the light source partly impinges directly on a portion of the illuminated area of the input key rear surface which portion is not provided with the screen 9, passes through the key body and thereafter emanates from the key toward the front through the light transmitting pattern 72. Further the light from the light source partly passes through the screen 9 on the input key rear surface, is thereby reduced in quantity, thereafter passes through the key body and emanates from the key forwardly thereof through the light transmitting pattern 72.

The quantity of light emanating forward through the light transmitting pattern 72 is adjustable according to the light transmittance and area of the screen 9. This makes it possible to illuminate the character with a sufficient amount of light required.

Stated specifically, the screen 9 is divided into a plurality of screen pieces 9a, 9b in accordance with the shape of the light transmitting pattern, and each of the screen pieces is adjusted in light transmittance and/or area. When the input key then has a light transmitting pattern representing a plurality of characters, the screen piece corresponding, for example, to a large character is set to a low light transmittance or given a small area, while the screen piece corresponding to a small character is set to a high light transmittance or given a large area. In this way, all the characters can be illuminated with brightness which is well-balanced as a whole.

The key input device and the portable telephone of the present invention are so adapted that the characters can be illuminated with a sufficient amount of light when the input keys are illuminated, and that the structure in the rear of each input key can not be seen through the key body when the light source is off.

BRIEF DESCRIPTION OF THE DRAWINGS

FIG. 8 is an enlarged view in section showing paths of propagation of rays when LEDs are on.

DETAILED DESCRIPTION OF EMBODIMENT

Figure 1:
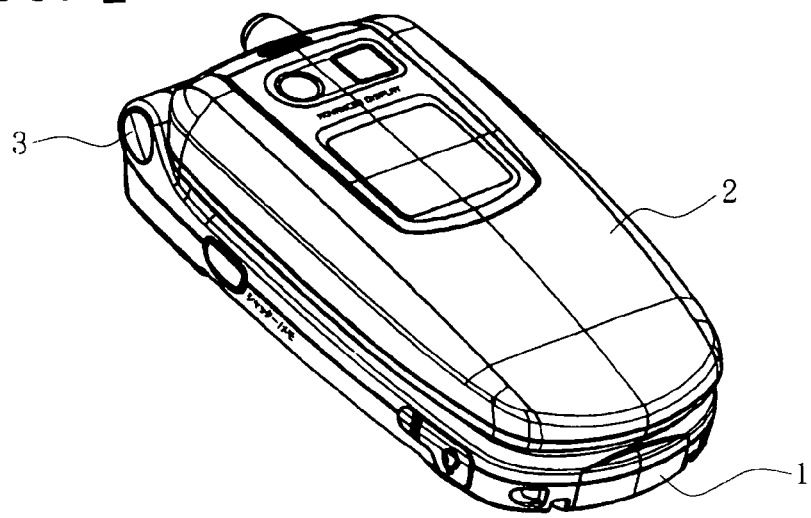
FIG. 1 is a perspective view showing a portable telephone of the invention in a closed state.
Figure 2:
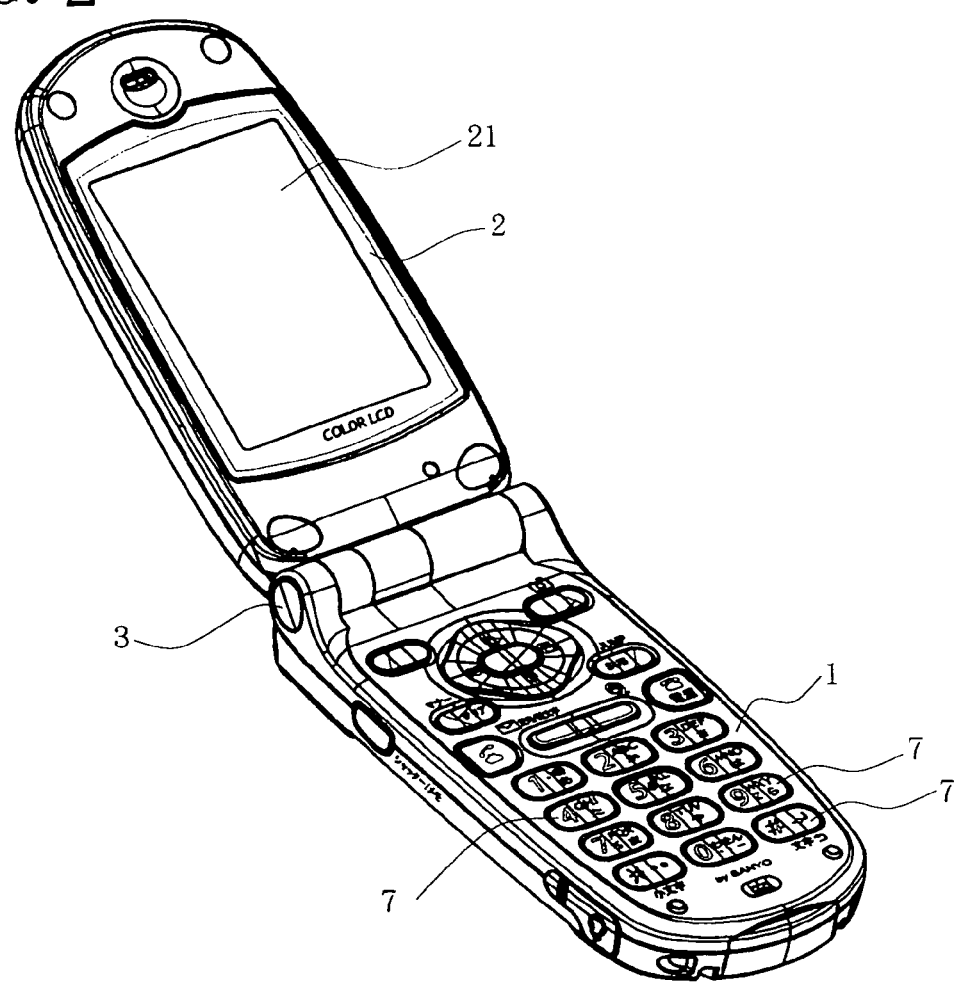
FIG. 2 is a perspective view showing the portable telephone of the invention in an opened state.

The present invention as embodied into a foldable portable telephone will be described in detail with reference to the drawings. With the telephone of the invention, a main body 1 having an arrangement of key tops 7 and a closure 2 having a display 21 are connected to each other by a hinge mechanism 3 and made openable as seen in FIGS. 1 and 2.

Figure 3:
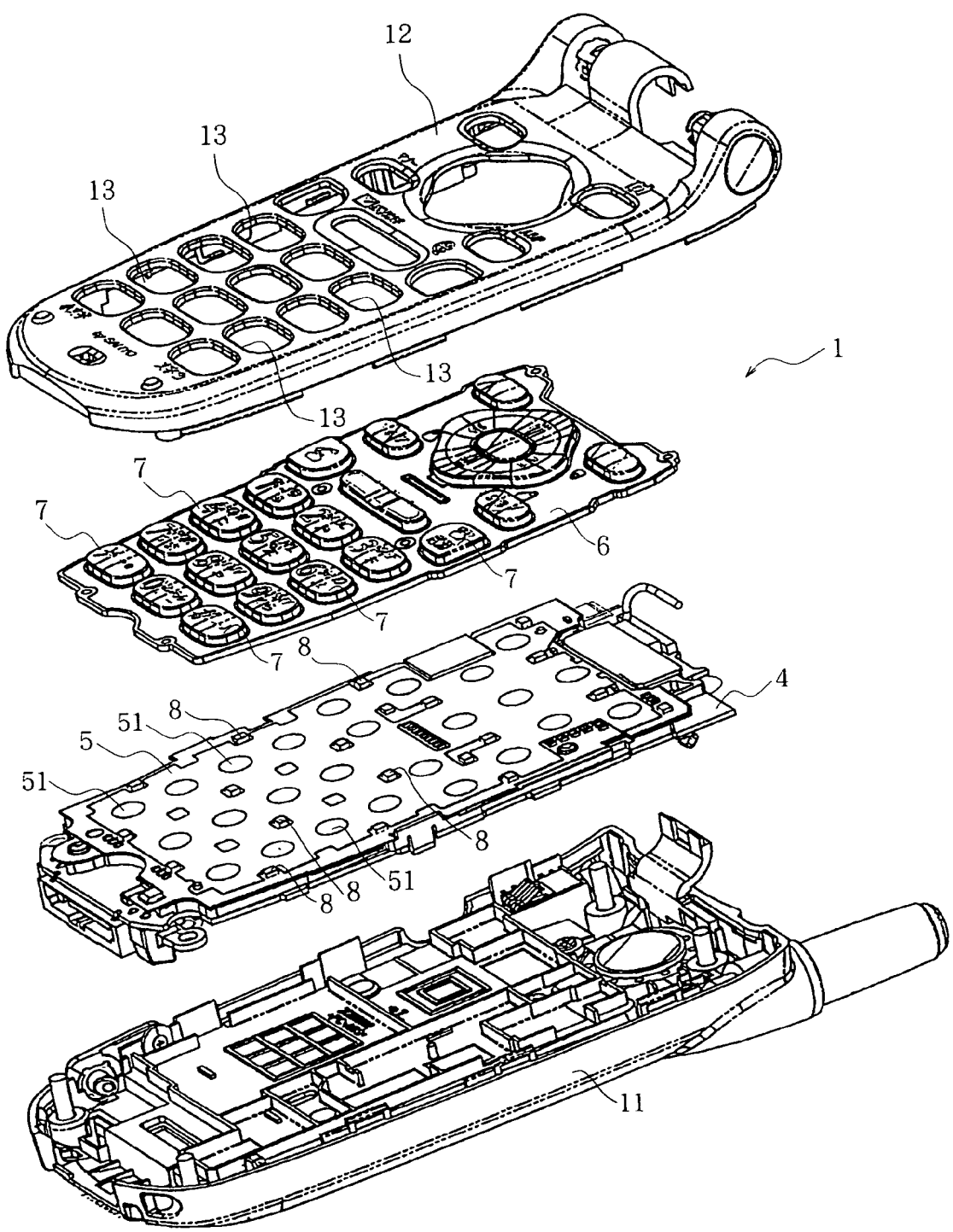
FIG. 3 is an exploded perspective view of a main body constituting the portable telephone.

With reference to FIG. 3, the main body 1 has a flat cabinet provided by a lower half case 11 and an upper half case 12, and comprises as accommodated in the cabinet a circuit board 4 having a plurality of electronic circuit chips mounted thereon, metal dome key input means 5 in the form of a sheet, and a rubber sheet 6 having the arrangement of key tops 7 fixedly adhered to the front surface thereof.

Figure 8:
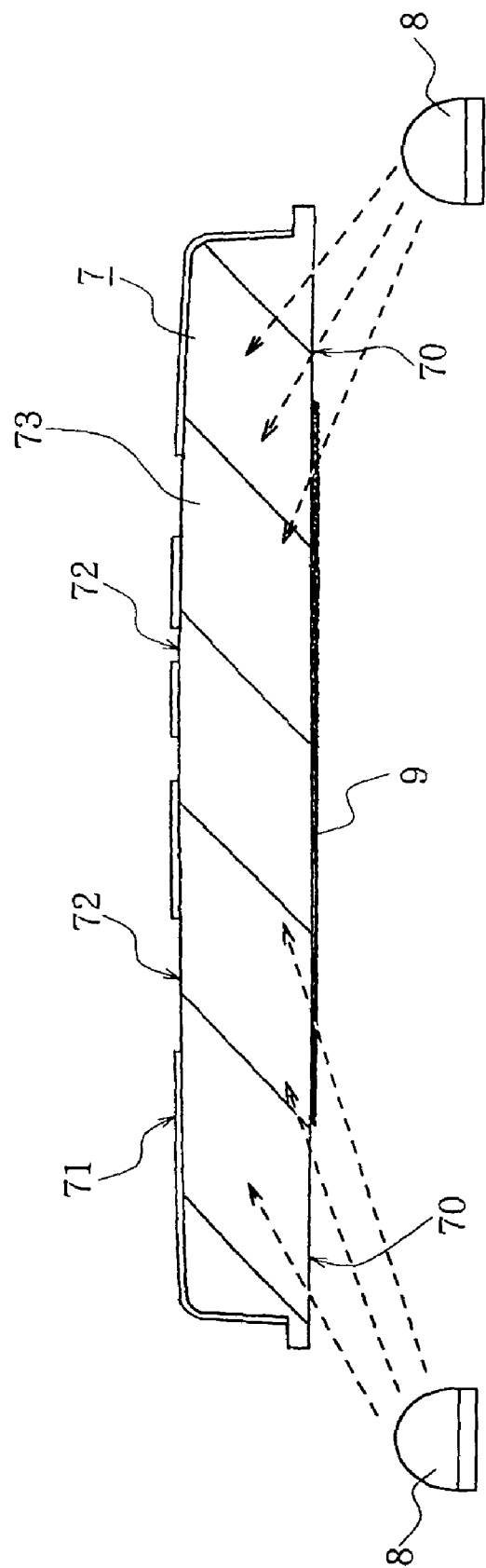

As shown in FIG. 8, each of the key tops 7 comprises a key body 73 made of a transparent resin and having a light blocking film 71 formed on the front surface of the key body 73 by coating with a coating composition. The light blocking film 71 is partly cut out by laser working to form a light transmitting pattern 72 representing a character (see FIG. 3). The key body 73 further has a semitransparent screen 9 formed on the rear surface thereof by printing and having a light transmittance of 10 to 90%. The screen 9 extends over a predetermined area of portion of the rear surface opposed to the light transmitting pattern 72.

Figure 6A:
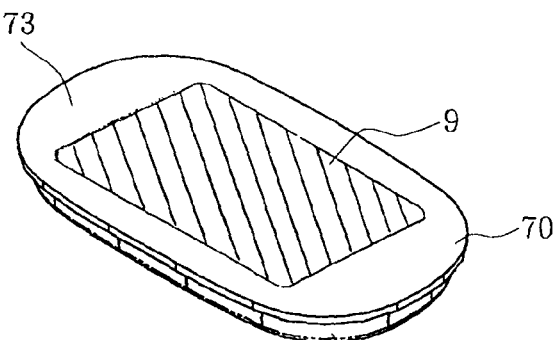
FIG. 6(a), FIG. 6(b) and FIG. 6(c) are perspective views of screens having various shapes and formed on the rear surfaces of key tops, respectively.
Figure 6B:
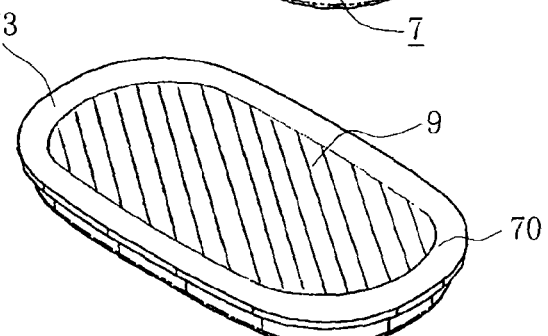
Figure 6C:
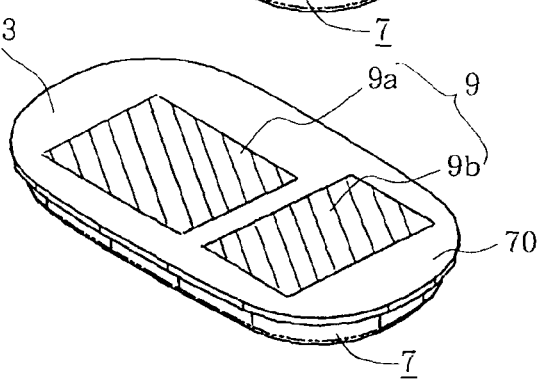

The screen 9 has a rectangular shape as shown in FIG. 6(a), or an elliptical shape as shown in FIG. 6(b), or comprises a plurality of divided screen pieces 9a, 9b as shown in FIG. 6(c), in conformity with the shape of the light transmitting pattern 72 formed on the surface of the key top 7. In any of these cases, the screen 9 has an unprinted portion 70 therearound for partly exposing the rear surface of the key body 73.

With reference to FIG. 3, a plurality of LEDs 8 are arranged on the circuit board 4 for illuminating the key tops 7 from the rear. The front surface of the metal dome key input means 5 is provided with an arrangement of metal domes 51 corresponding to the arrangement of key tops 7 and each comprising a pair of contacts. The upper half case 12 is provided with a plurality of key windows 13 for exposing the heads of the key tops 7.

Figure 4:
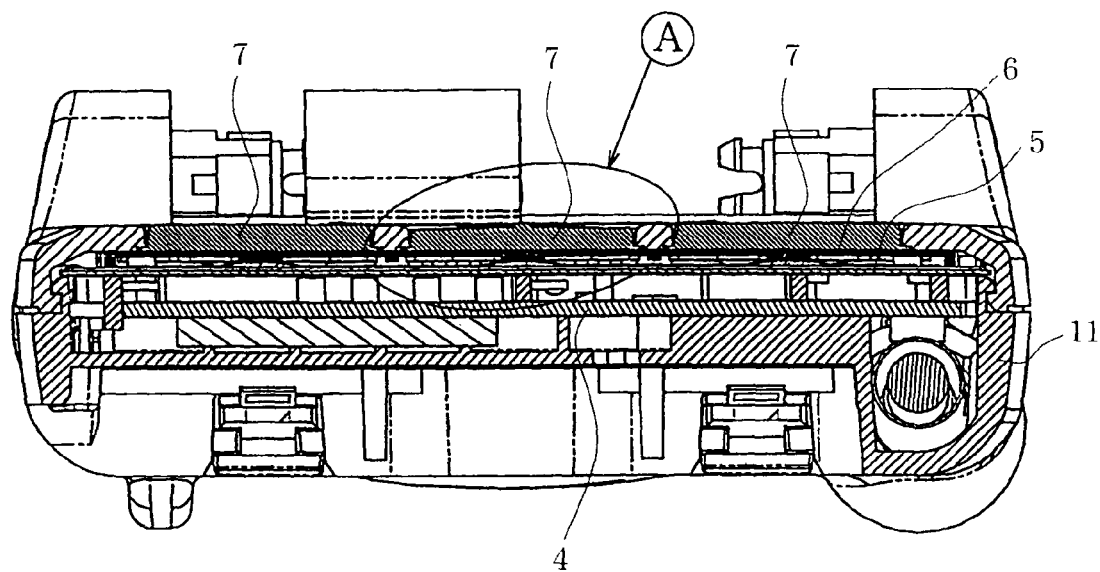
FIG. 4 is a view in section of the main body.
Figure 5:
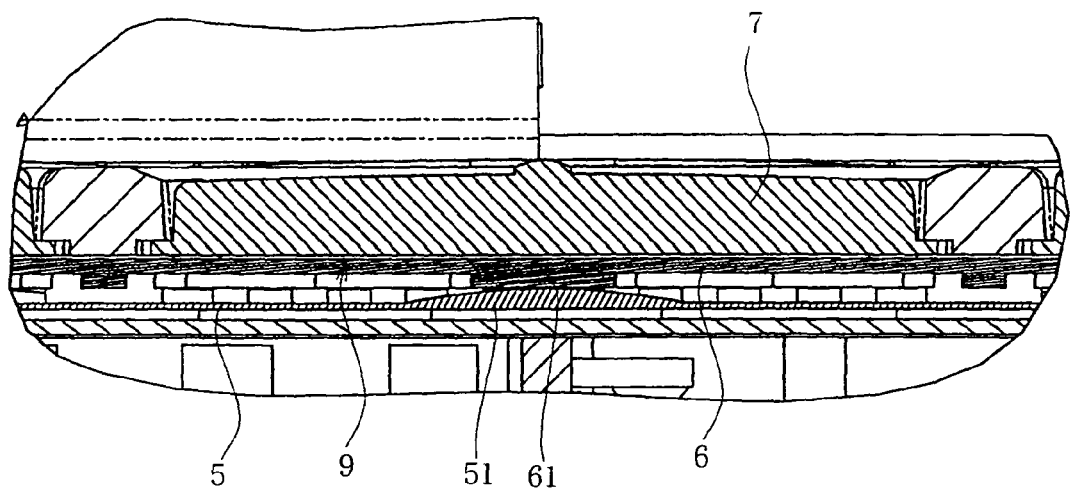
FIG. 5 is a fragmentary enlarged view of FIG. 4.

The circuit board 4, metal dome key input means 5 and rubber sheet 6 are arranged in superposed layers and installed on the lower half case 11 as shown in FIG. 4. As shown in FIG. 5, a projection 61 provided on the rear surface of the rubber sheet 6 and corresponding to each key top 7 is in contact with the corresponding dome 51 on the metal dome key input means 5. Accordingly, when a particular key top 7 is depressed, the pair of contacts of the dome 51 corresponding to the key top 7 are closed to input a character corresponding to the key top 7.

With the portable telephone described, the LEDs 8 are held off while the surroundings are light as in the outdoors during the daytime. When the surface of the key top 7 is observed in this state, the screen 9 in the rear can be seen through the light transmitting pattern 72 as shown in FIG. 7(a) since the key body 73 is transparent, whereas the character appears uniformly black in its entirety and is satisfactorily visible because the screen 9 is semitransparent.

On the other hand, the LEDs 8 are turned on when the surroundings are dark as in the nighttime. In this state, the light from LEDs 8 is incident on the unprinted portion 70 and the screen 9 on the rear surface of the key body 73 as seen in FIG. 8. The light incident on the unprinted portion 70 on the rear surface of the key body 73 passes through the key body 73 and thereafter emanates from the light transmitting pattern 72 toward the front. Further the light impinging on the screen 9 passes through the screen 9, is thereby reduced in quantity, then passes through the key body 73 and emanates from the light transmitting pattern 72 toward the front.

The amount of light emanating from the light transmitting pattern 72 forward is accurately adjustable when the screen 9 is formed by printing. Stated more specifically, the screen 9 is altered in light transmittance or area to thereby adjust the amount of light to be transmitted through the screen 9, by selecting the material for the screen 9 and the size and dimensions of the mask. As a result, the light transmitting pattern 72 formed on the front surface of the key top 7 will be illuminated brightly as shown in FIG. 7(b).

Figure 7A:
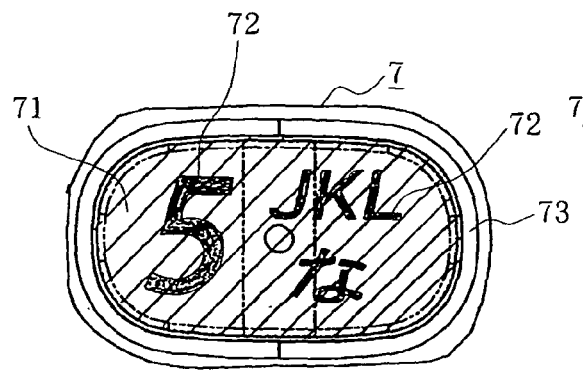
FIG. 7(a) and FIG. 7(b) are diagrams showing characters on a key top with light turned off and as lighted up, respectively.
Figure 7B:
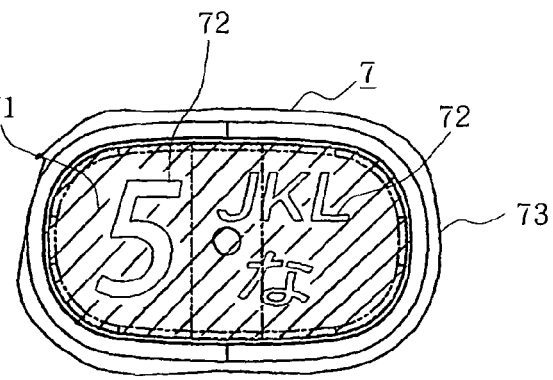

In the case where a plurality of characters are represented by the light transmitting pattern 72 of one key top 7 as shown in FIG. 7(a) and FIG. 7(b), the screen 9 can be composed of a plurality of divided screen pieces 9a, 9b as shown in FIG. 6(c). In this case, each of the screen pieces is adjusted in light transmittance and area. For example, the screen piece corresponding to a large character is set to a low light transmittance, with a small area given thereto, while the screen piece corresponding to a small character is set to a high light transmittance and given a large area. In this way, all the characters can be illuminated with brightness which is well-balanced as a whole.

In the case of the portable telephone according to the invention described above, the characters can be illuminated with a sufficient amount of light when the LEDs 8 are turned on. When the LEDs 8 are off, there is no likelihood that the structure in the rear will be seen through the key top 7.

The device or the telephone of the invention is not limited to the foregoing embodiment in construction but can be modified variously by one skilled in the art without departing from the spirit of the invention as set forth in the appended claims. The key input device of the invention is not limited to use in portable telephones but is applicable also to various electronic devices having a plurality of manipulating keys.

What is claimed is:

1. A key input device comprising
 a plurality of input keys being arranged on a surface of a main body case; each of the input keys having a body of transparent resin; the input keys having a front surface and a rear surface;
 a light blocking film being formed over a front surface of the input keys; the light blocking film being partly cut out to form a light transmitting pattern representing a key identification symbol;
 a light source being positioned below the input keys so that a light is illuminated directly onto the rear surface of the input keys; the light source being capable of illuminating the input keys;
 a semitransparent screen being formed on the rear surface of the input keys in an area to be illuminated with the light source; the screen extending over a portion of the area on the rear surface of the input keys to be illuminated.

2. A key input device according to claim 1 wherein the screen is adjusted in light transmittance and area in accordance with the shape of the light transmitting pattern.

3. A key input device according to claim 2 wherein the screen is divided into a plurality of screen pieces in accordance with the shape of the light transmitting pattern, and each of the screen pieces is adjusted in light transmittance.

4. A key input device according to claim 2 wherein the screen is divided into a plurality of screen pieces in accordance with the shape of the light transmitting pattern, and each of the screen pieces is adjusted in area.

5. A key input device according to claim 1 wherein the screen is colored.

6. A portable telephone comprising
 a plurality of input keys being arranged on a surface of a main body case; each of the input keys having a body of transparent resin; the input keys having a front surface and a rear surface;

a light blocking film being formed over a front surface of the input keys; the light blocking film being partly cut out to form a light transmitting pattern representing a key identification symbol;

a light source being positioned below the input keys so that a light is illuminated directly onto the rear surface of the input keys; the light source being capable of illuminating the input keys;

a semitransparent screen being formed on the rear surface of the input keys in an area to be illuminated with the light source; the screen extending over a portion of the area on the rear surface of the input keys to be illuminated.

* * * * *